United States Patent
White

(10) Patent No.: US 6,866,454 B2
(45) Date of Patent: Mar. 15, 2005

(54) SECURITY BAR FOR USE WITH VEHICLE HAVING A HAULING BED

(75) Inventor: John N. White, Magnolia, AR (US)

(73) Assignee: Alcoa Inc., Pittsburgh, PA (US)

(*) Notice: Subject to any disclaimer, the term of this patent is extended or adjusted under 35 U.S.C. 154(b) by 0 days.

(21) Appl. No.: 10/644,662

(22) Filed: Aug. 19, 2003

(65) Prior Publication Data

US 2004/0067119 A1 Apr. 8, 2004

Related U.S. Application Data

(60) Provisional application No. 60/405,146, filed on Aug. 21, 2002.

(51) Int. Cl.$^7$ .................................................. B60P 7/15
(52) U.S. Cl. ........................ 410/143; 410/106; 410/115; 410/144
(58) Field of Search ................................ 410/143–145, 410/151, 106, 115; 248/351; 211/105.1

(56) References Cited

U.S. PATENT DOCUMENTS

| | | | | |
|---|---|---|---|---|
| 3,595,125 A | * | 7/1971 | Jacobs ........................ 410/106 |
| 3,762,097 A | * | 10/1973 | Gallo ............................. 47/84 |
| 4,737,056 A | * | 4/1988 | Hunt ........................... 410/151 |
| 5,092,504 A | * | 3/1992 | Hannes et al. .............. 224/403 |
| 5,472,301 A | * | 12/1995 | Wallen ........................ 410/151 |
| 5,688,087 A | * | 11/1997 | Stapleton et al. ........... 410/150 |
| 5,807,047 A | * | 9/1998 | Cox ............................ 410/152 |
| 6,010,287 A | * | 1/2000 | Sommermeyer et al. .... 410/144 |
| 6,270,301 B1 | * | 8/2001 | Dunlop ....................... 410/115 |
| 6,511,272 B2 | * | 1/2003 | Stafford ...................... 410/121 |
| 6,632,055 B2 | * | 10/2003 | Kania .......................... 410/38 |

* cited by examiner

Primary Examiner—Stephen Gordon
(74) Attorney, Agent, or Firm—Daniel P. Cillo; Eckert Seamans Cherin & Mellott

(57) ABSTRACT

A security bar for use with a truck having a hauling bed includes an elongated cross bar, a pair of end plates, and a pair of fastening elements used to attach the security bar to the hauling bed. The elongated cross bar defines openings at each end. The pair of end plates cooperates, respectively, with the openings at the ends of the cross bar. A tie down bar may be attached to the cross bar for securing cargo on the hauling bed.

23 Claims, 5 Drawing Sheets

SECURITY BAR FOR USE WITH VEHICLE HAVING A HAULING BED

RELATED APPLICATION

This application claims the benefit of U.S. Provisional Patent Application Ser. No. 60/405,146, filed Aug. 21, 2002, entitled "Security Bar For Use With Vehicle Having A Hauling Bed".

BACKGROUND OF THE INVENTION

1. Field of the Invention

The present invention relates to a device adapted for installation on a hauling bed of a truck, such as a pickup truck, that may be used to secure cargo located on the hauling bed.

2. Description of the Prior Art

Owners of trucks having a hauling bed, such as pickup trucks, are keenly aware of the problem of securing cargo located on the hauling bed. In general, original equipment manufacturers do not provide locations where cargo may be secured to the hauling bed. Owners of pickup trucks often must develop their own fastening devices, or seek out specialty makers of tie-down equipment that may be installed on the hauling bed. With respect to the latter, such retrofit devices are often expensive. With regard to home-made devices, their reliability cannot be guaranteed. Accordingly, a need exists for an improved device for attaching to the hauling bed of a vehicle such as pickup truck which may be used to secure cargo located on the hauling bed.

SUMMARY OF THE INVENTION

The present invention is a security bar for use with vehicles, such as pickup trucks, having a hauling bed. The security bar includes an elongated cross bar, a pair of end plates, and a pair of fastening elements. The cross bar defines openings at each end. The pair of end plates cooperates, respectively, with the openings at the ends of the cross bar. The fastening elements are attached to the end plates, respectively, and are configured for attachment to the hauling bed of the truck.

The fastening elements may each include an anchor block and a bed plate. The anchor blocks may be located between the end plates and the bed plates, respectively. The anchor blocks and the bed plates may be connected to the end plates with respective mechanical fasteners. A pair of resilient pads may be located, respectively, between the end plates and anchor blocks for accommodating vibration between the end plates and the anchor blocks. The resilient pads may be made of vinyl or rubber. The cross bar and end plates may be made of aluminum or aluminum alloy.

The respective mechanical fasteners may be threaded and cooperate with threaded holes defined in the bed plates. The mechanical fasteners may be eye bolts. Additionally, at least one eye bolt may be attached to the cross bar for tying down cargo located on the hauling bed. This intermediate eye bolt may be located at about a midpoint of the cross bar. A tie down bar may be attached to the eye bolt for securing the cargo on the hauling bed. The security bar may further include a bumper attached to the cross bar for absorbing impacts from cargo located on the hauling bed when the security bar is attached to the hauling bed. The bumper may be resilient and made of vinyl or rubber. The resilient bumper may extend along a longitudinal edge of the cross bar. The cross bar, end plates, anchor plates, and bed plates may be made of aluminum or aluminum alloy. Additionally, the present invention is directed to a truck having a vehicle body with a hauling bed and further having the security bar described generally hereinabove mounted to the hauling bed. Further details and advantages of the present invention will become apparent from the following detailed description read in conjunction with the drawings.

DETAILED DESCRIPTION OF PREFERRED EMBODIMENTS

Figure 1:
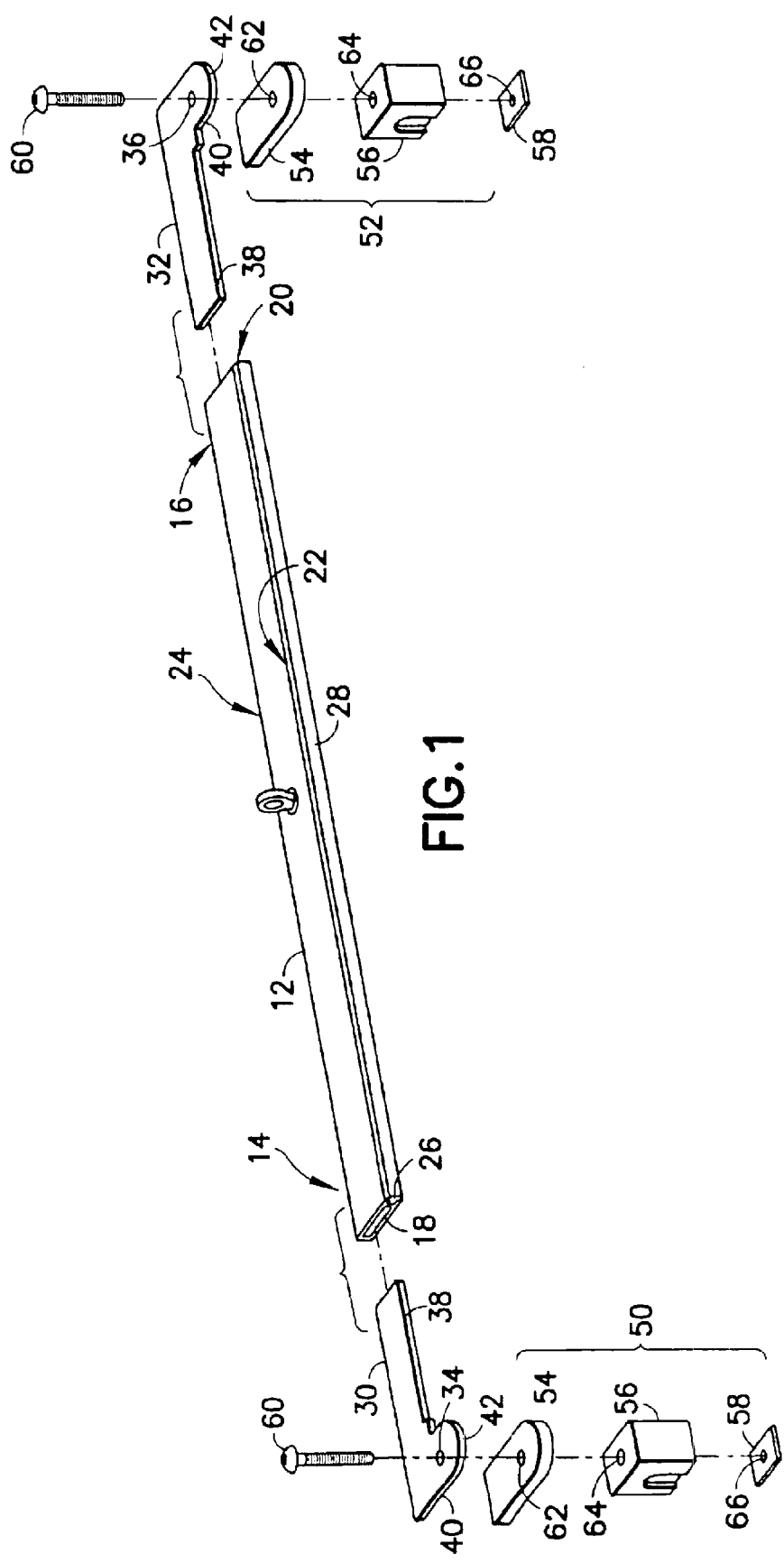
FIG. 1 is an exploded perspective view of a security bar for use with a truck having a hauling bed in accordance with the present invention.

Referring to FIG. 1, a security bar 10 for use with a truck having a hauling bed is shown. This security bar 10 includes an elongated cross bar 12. The cross bar 12 has two ends 14, 16. An opening is defined in each of the ends of the cross bar 12. The openings are separately designated with reference numerals 18, 20. A single opening or cavity extending longitudinally through the cross bar 12 may replace the two openings 18, 20. The cross bar 12 further includes front and rear longitudinal edges 22, 24. The front longitudinal edge 22 defines a recess or groove 26. Preferably, a resilient bumper 28 is received in the groove 26. The bumper 28 is attached to the cross bar 12 for absorbing impacts from cargo located on the hauling bed when the security bar 10 is attached to the hauling bed. The bumper 28 may be made of a resilient material such as vinyl or rubber, and the like.

A pair of end plates 30, 32 cooperate, respectively, with the openings 18, 20 defined in the ends of the cross bar 12. The end plates 30, 32 are generally L-shaped in configuration and define holes 34, 36 extending therethrough. In particular, the end plates 30, 32 are each defined by a first or longitudinal leg 38 and a second or transverse leg 40. The respective holes 34, 36 are defined in the transverse leg 40 of each of the end plates 30, 32. The transverse leg 40 of each of the end plates 30, 32 may have a rounded front edge 42 in order to minimize the possibility of causing damage to cargo located on the hauling bed, which may shift and impact the security bar 10 during transit. The longitudinal leg 38 of each of the end plates 30, 32 is received in the respective openings 18, 20 defined in the cross bar 12, and is preferably slidably received within the openings 18, 20. The security bar 10 is generally attached to the hauling bed by a pair of fastening elements 50, 52. The fastening elements 50, 52 are configured to attach the end plates 30, 32 directly to the hauling bed of the truck. As shown in FIG. 1, the fastening elements 50, 52 generally include four components. In particular, the fastening elements 50, 52 each include a resilient pad 54, an anchor block 56, a bed plate 58, and a mechanical fastener 60, which is used to connect the respective fastening elements 50, 52 to the hauling bed. The resilient pads 54 and the anchor blocks 56 are located between a bottom surface of the end plates 30, 32 and the bed plates 58 at each of the ends of the cross bar 12. In particular, the resilient pads 54 are provided between the end plates 30, 32 and the anchor blocks 56 for accommodating vibration between the end plates 30, 32 and anchor blocks 56 at each of the ends of the cross bar 12. The resilient pads 54 may be made of vinyl or rubber in a similar manner to the bumper 28 discussed previously.

The anchor blocks 56 provide spacing between the cross bar 12 and the hauling bed, but may be omitted such that the cross bar 12 generally lies substantially flat against the hailing bed as discussed hereinafter. The mechanical fasteners 60 for the respective fastening elements 50, 52 extend through respective apertures 62, 64, 66 defined in the resilient pads 54, anchor blocks 56, and bed plates 58. The apertures 66 defined in the bed plates 58 are preferably internally threaded to mate with threads of the mechanical fasteners 60. As shown in FIG. 1, the mechanical fasteners 60 may be simple bolts, or preferably eye bolts, as shown, for example, in FIG. 3 discussed hereinafter.

Figure 2:
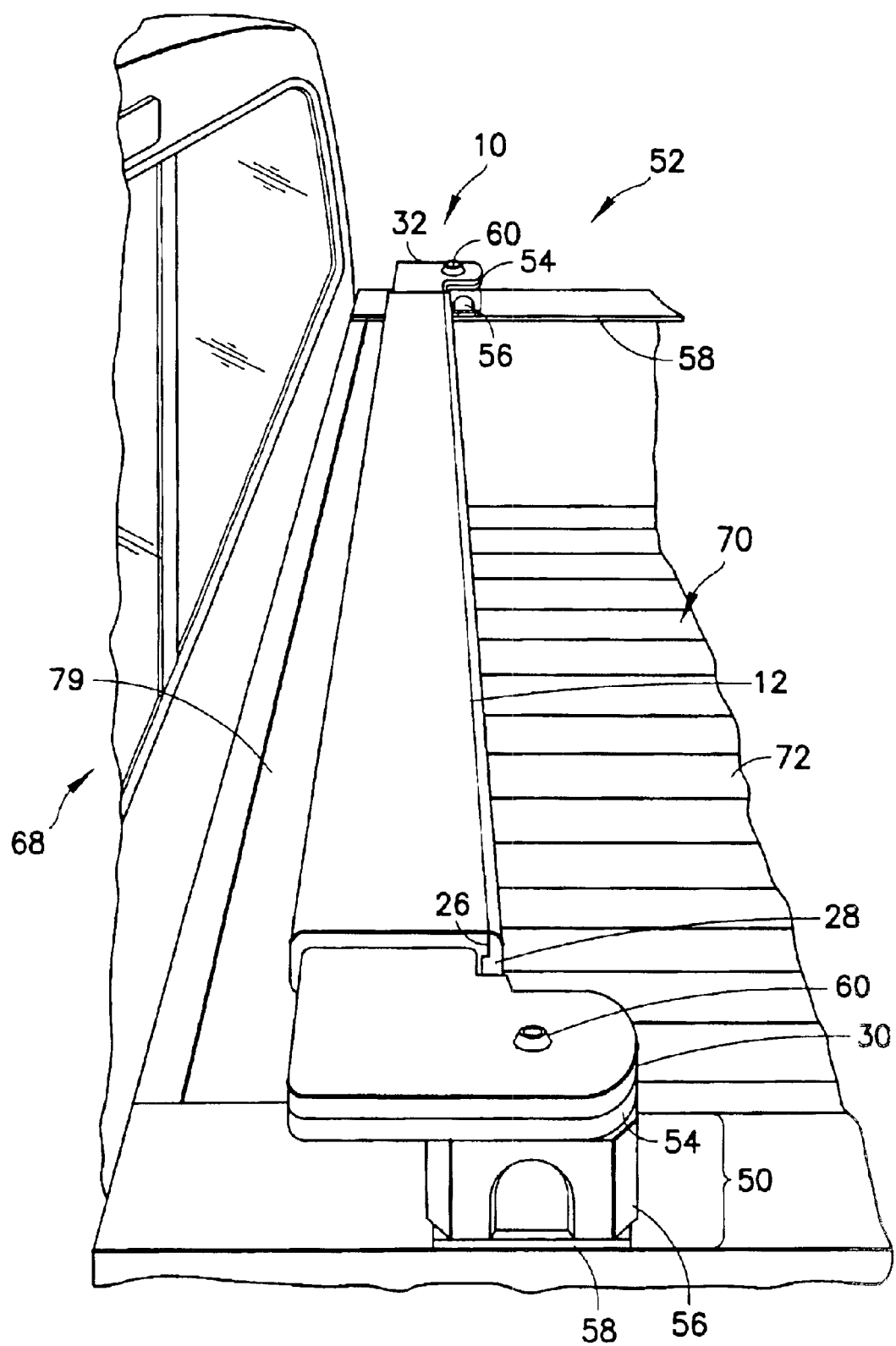
FIG. 2 is perspective view of the hauling bed of a pickup truck showing the security bar attached to the hauling bed.

Referring now to FIGS. 1 and 2, the attachment of the security bar 10 to a hauling bed of a truck will now be discussed. FIG. 2 shows a pickup truck 68 having a hauling bed 70 with the security bar 10 attached thereto. The hauling bed 70 forms part of the vehicle body of the pickup truck as is known in the art. As shown in FIG. 2, the bed plates 58 of each of the fastening elements 50, 52 is in contact with the hauling bed 70. The anchor blocks 56 provide spacing between the hauling bed 70 and the respective end plates 30, 32. The end plates 30, 32, anchor blocks 56, and bed plates 58 are fixed to the hauling bed 70 by the respective mechanical fasteners 60. As stated previously, the resilient pads 54 may be inserted between the end plates 30, 32 and anchor blocks 56 to accommodate vibration between the end plates 30, 32 and anchor blocks 56. Cargo received on a floor 72 of the hauling bed 70 may be tied to the cross bar 12. The resilient bumper 28 located at the front longitudinal edge 22 of the cross bar 12 will cushion the cargo should it shift in transit and impact the cross bar 12. The cross bar 12, end plates 30, 32, anchor blocks 56, and bed plates 58 may be made of any type of sturdy material. For example, these items may be made of steel, aluminum or aluminum alloy, hard plastic, or a composite material.

Figure 3:
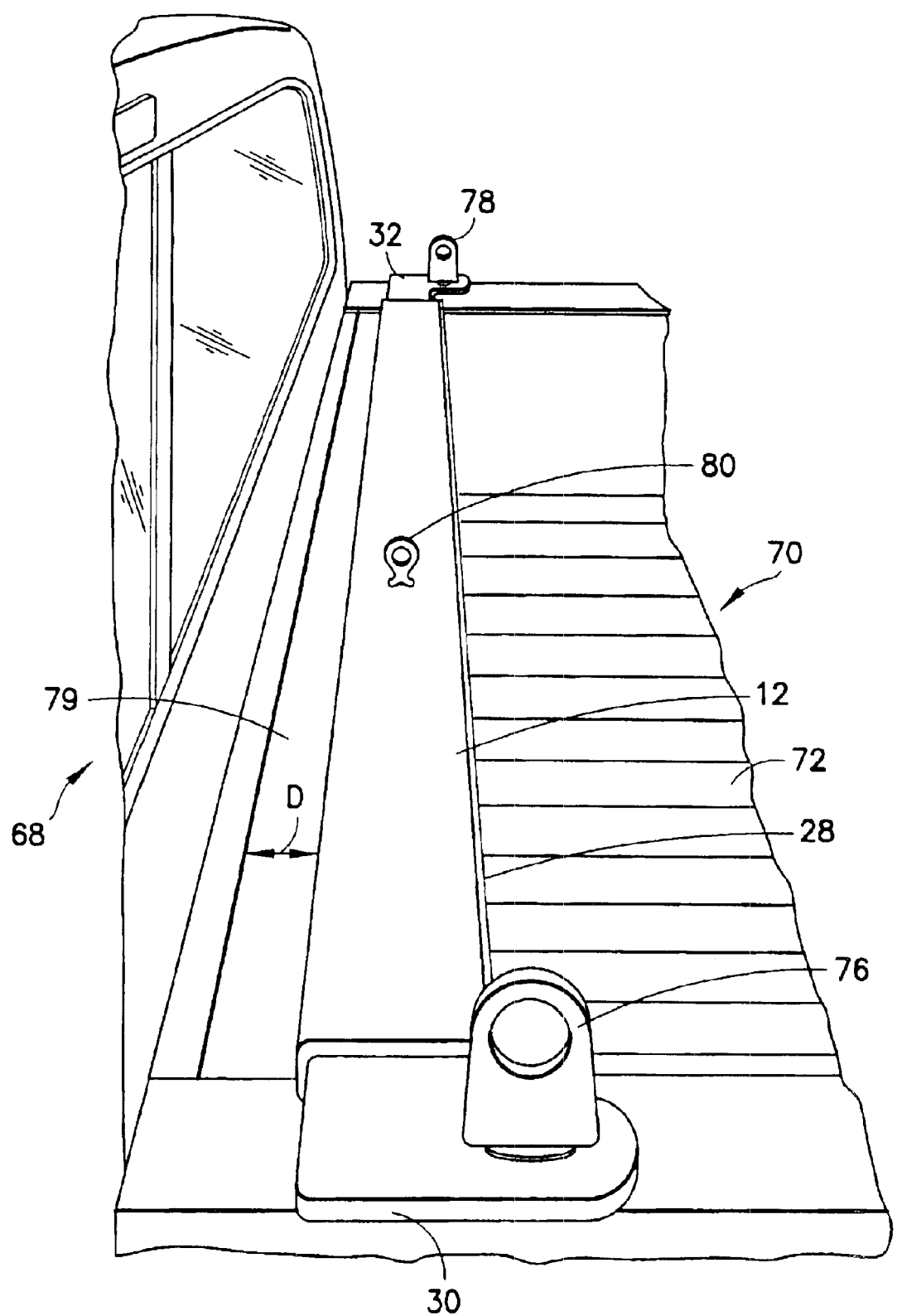
FIG. 3 is a second perspective view of the security bar and hauling bed of FIG. 2 showing additional features of the security bar.

In FIG. 2, the mechanical fasteners 60 are shown as simple bolts. A modification to this design is shown in FIG. 3. In FIG. 3, eye bolts 76, 78, replace the mechanical fasteners 60. Additionally, as shown in FIG. 3, the resilient pads 54, anchor blocks 56, and bed plates 58 have been removed. Thus, the end plates 30, 32 generally lie flat against the hauling bed 70. The eye bolts 76, 78 attach the respective end plates 30, 32 directly to the hauling bed 70. The eye bolts 76, 78 provide locations where cargo may be secured.

The cross bar 12 may be spaced a distance D away from a front end 79 of the hauling bed 70 in order to allow the user to extend fastening cords and other attachment means around the cross bar 12. An additional modification shown to the security bar 10 is shown in FIG. 3, wherein an intermediate eye bolt 80 is located at about a midpoint of the cross bar 12. The intermediate eye bolt 80 provides another location where cargo may be secured on the hauling bed 70.

Figure 4:
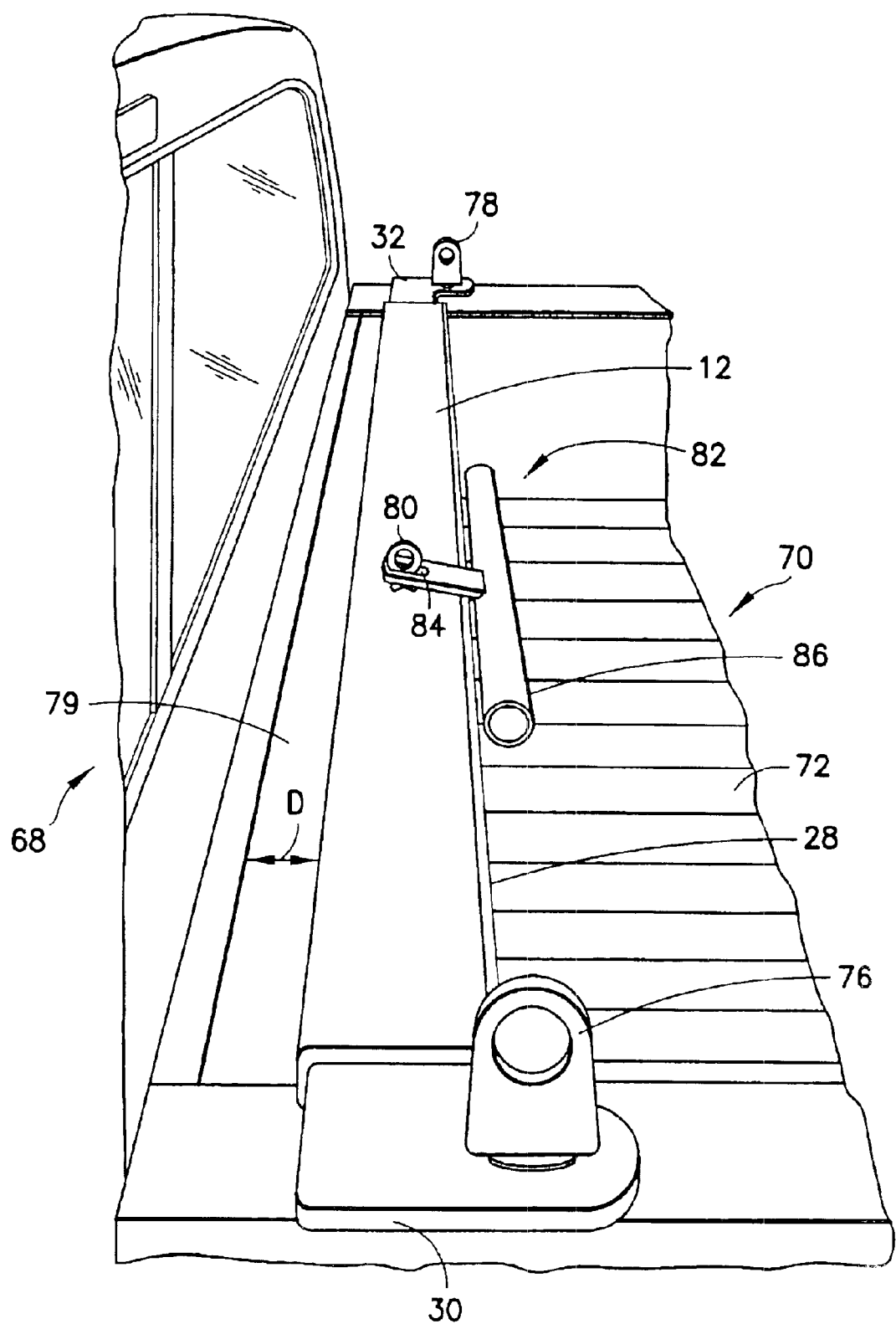
FIG. 4 is a perspective view of the security bar and hauling bed of FIG. 2 additionally showing a tie down bar attached to the security bar.
Figure 5:
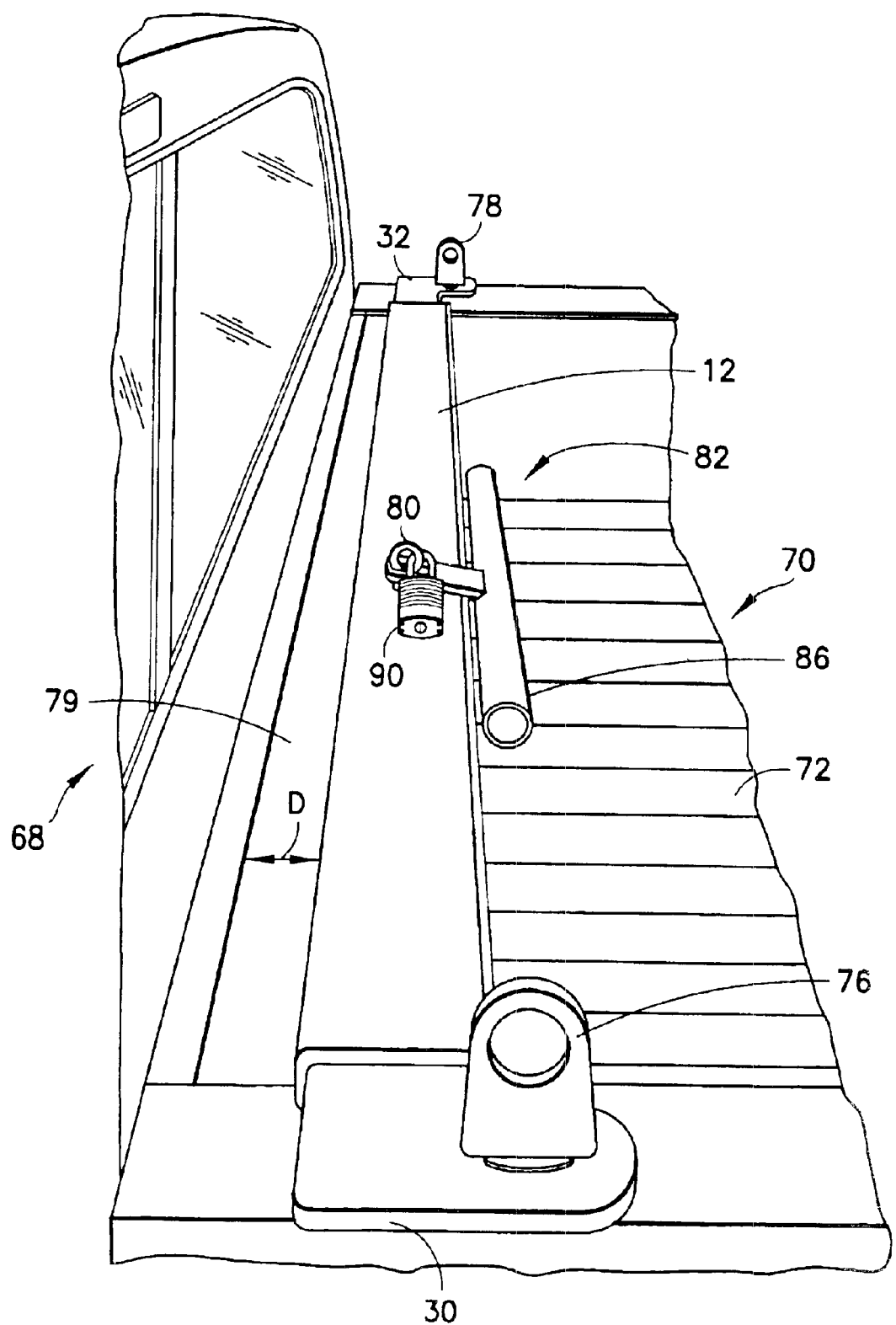
FIG. 5 is a second perspective view of the security bar and hauling bed of FIG. 4 showing the attachment bar secured to the security bar with a padlock.

Referring now to FIGS. 4 and 5, a further modification of the security bar 10 is shown. The security bar 10 shown in FIGS. 4 and 5 further includes an attachment bar 82 engaged with the intermediate eye bolt 80. The attachment bar 82 is generally T-shaped and defines a slot 84 for attaching the attachment bar 82 to the eye bolt 80. The eye bolt 80 is received through the slot 84. The attachment bar 82 includes a hollow cylindrical portion 86 through which chains or heavy gauge wire may be threaded, with the chains used to lock valuable cargo received on the hauling bed 70. For example, an All Terrain Vehicle (ATV—not shown) may be located on the hauling bed 70. In order to prevent the ATV from being stolen, chains may be threaded through the cylindrical portion 86 of the attachment bar 82 and further secured through portions of the ATV and locked with conventional padlocks. Thus, the ATV is integrally secured to the hauling bed 70 of the pickup truck 68. A padlock 90 is shown in FIG. 5 and is used to secure the attachment bar 82 to the cross bar 12. The attachment bar 82 provides the ability to safely secure valuable cargo and prevent it from being stolen. The attachment bar 82 may be made of materials identified previously in connection with the cross bar 12 and end plates 30, 32.

In view of the foregoing, the present invention provides a security bar for use with trucks having a hauling bed that provides the ability to easily and safely secure cargo on the hauling bed. The security bar may be adapted to lock valuable cargo on the hauling bed to prevent it from being stolen. While preferred embodiments of the present invention were described hereinabove, the scope of the present invention is defined in the appended claims and equivalents thereto. Various modifications and alterations may be made to the present invention without departing from the spirit and scope of the present invention.

I claim:

1. A security bar for use with trucks having a hauling bed, comprising:
    an elongated cross bar defining openings at each end;
    a pair of end plates cooperating, respectively, with the openings at the ends of the cross bar; and
    a pair of fastening elements attached to the end plates, respectively, and configured for attachment to a truck; wherein the fastening elements each comprise an anchor block and bed plate, with the respective anchor blocks located between the end plates and bed plates, respectively, and with the anchor blocks and bed plates connected to the respective end plates with respective mechanical fasteners.

2. The security bar of claim 1 further comprising a pair of resilient pads located, respectively, between the end plates and anchor blocks for accommodating vibration between the end plates and anchor blocks.

3. The security bar of claim 2 wherein the resilient pads are made of vinyl or rubber.

4. The security bar of claim 1 wherein the cross bar and end plates are made of aluminum or aluminum alloy.

5. The security bar of claim 1 wherein the respective mechanical fasteners are threaded and cooperate with threaded holes defined in the bed plates, and where the pair of fastening elements are configured for attachment to a hauling bed of the truck.

6. The security bar of claim 5 wherein the mechanical fasteners are eye bolts.

7. The security bar of claim 1 further comprising at least one eye bolt attached to the cross bar for tying down cargo located on a hauling bed of the truck.

8. The security bar of claim 7 wherein the eye bolt is located at about a midpoint of the cross bar, and further comprising a tie down bar attached to the eye bolt.

9. The security bar of claim 1 further comprising a bumper attached to the cross bar for absorbing impacts from cargo located on a hauling bed of the truck when the security bar is attached to the hauling bed.

10. The security bar of claim 9 wherein the bumper is resilient and made of vinyl or rubber.

11. The security bar of claim 10 wherein the resilient bumper extends along a longitudinal edge of the cross bar.

12. The security bar of claim 1 wherein the cross bar, end plates, anchor blocks, and bed plates are made of aluminum or aluminum alloy.

13. A truck, comprising:
- a vehicle body having a hauling bed for carrying cargo; and
- a security bar attached to the hauling bed for securing cargo carried on the hauling bed, with the security bar further comprising:
- an elongated cross bar defining openings at each end;
- a pair of end plates cooperating, respectively, with the openings at the ends of the cross bar;
- a pair of fastening elements fixedly attaching the respective end plates to the hauling bed;
- wherein the fastening elements each comprise an anchor block and bed plate, with the respective anchor blocks located between the end plates and bed plates, respectively, and with the respective end plates, anchor blocks, and bed plates connected to the vehicle body bed with respective mechanical fasteners.

14. The truck of claim 13 wherein the mechanical fasteners are eye bolts.

15. The truck of claim 13 further comprising a pair of resilient pads located, respectively, between the end plates and anchor blocks for accommodating vibration between the end plates and anchor blocks.

16. The truck of claim 15 wherein the resilient pads are made of vinyl or rubber.

17. The truck of claim 13 further comprising at least one eye bolt attached to the cross bar for tying down cargo located on the hauling bed.

18. The truck of claim 17 wherein the eye bolt is located at about a midpoint of the cross bar, and further comprising a tie down bar attached to the eye bolt.

19. The truck of claim 13 further comprising a bumper attached to the cross bar for absorbing impacts from cargo located on the hauling bed when the security bar is attached to the vehicle body.

20. The truck of claim 19 wherein the bumper is resilient and made of vinyl or rubber.

21. The truck of claim 20 wherein the resilient bumper extends along a longitudinal edge of the cross bar.

22. The truck of claim 13 wherein the cross bar, end plates, anchor blocks, and bed plates are made of aluminum or aluminum alloy.

23. A security bar for use with a pickup truck, comprising:
- an elongated cross bar defining openings at each end;
- a pair of end plates cooperating, respectively, with the openings at the ends of the cross bar; and
- a pair of fastening elements attached to the end plates, respectively, and configured for attachment to a hauling bed of the pickup truck with the fastening elements each comprising:
- an anchor block;
- a bed plate, with the respective anchor blocks located between the end plates and bed plates, respectively, and with the anchor blocks and bed plates connected to the end respective end plates, with respective mechanical fasteners; and
- a pair of resilient pads located, respectively, between the end plates and anchor blocks for accommodating vibration between the end plates and anchor blocks,
- wherein the cross bar, end plates, anchor blocks, and bed plates are made of aluminum or aluminum alloy.

* * * * *